United States Patent [19]

Simokat

[11] 4,324,953

[45] Apr. 13, 1982

[54] FOUR-PARTY AUTOMATIC NUMBER IDENTIFICATION CIRCUIT ARRANGEMENTS

[75] Inventor: Frank L. Simokat, Babylon, N.Y.

[73] Assignee: TII Industries Inc., Copiague, N.Y.

[21] Appl. No.: 151,407

[22] Filed: May 19, 1980

[51] Int. Cl.³ .................................. H04M 13/00
[52] U.S. Cl. .......................... 179/17 A; 179/18 FH
[58] Field of Search ............ 179/17 A, 17 E, 81 R, 179/18 FH, 18 FA

[56] References Cited

U.S. PATENT DOCUMENTS

| 3,278,687 | 10/1966 | Everett | 179/17 A |
| 3,974,342 | 8/1976 | Wagner | 179/17 A |
| 4,001,512 | 1/1977 | Proctor et al. | 179/17 A |
| 4,054,942 | 10/1972 | Chambers, Jr. | 179/17 A |
| 4,079,205 | 3/1978 | Glenn | 179/17 A |
| 4,149,040 | 4/1979 | Atkinson | 179/17 A |
| 4,209,667 | 6/1980 | Simokat | 179/17 A |

Primary Examiner—Gerald L. Brigance
Attorney, Agent, or Firm—Martin Sachs

[57] ABSTRACT

A station identification circuit arrangement for use with central office equipment that utilizes automatic detection equipment for the detection of one of four parties on a four party-line where a call is initiated from a preselected party's telephone without requiring access to or rewiring of the party's telephone.

15 Claims, 6 Drawing Figures

FOUR-PARTY AUTOMATIC NUMBER IDENTIFICATION CIRCUIT ARRANGEMENTS

BACKGROUND OF THE INVENTION

1. Field of the Invention

This invention relates to telephone system equipment that is used at the subscriber's end of a subscriber's line on conjunction with a telephone station, and in particular to a station identification circuit arrangement for ANI (Automatic Number Identification) mark circuits which are detected by central office equipment when a call is initiated by one of four parties on a four-party line.

2. Discussion of the Relevant Art

ANI mark circuits (also referred to as station identification circuits) are used with plural party lines to identify toll calls dialed by a selected party (customarily the tip party as distinguished from the ring party) for billing purposes in an automatic number identification system.

Prior to this invention, it has generally been the practice to wire ringer isolator and ANI mark circuits directly into the telephone sets. It also has been a custom to incorporate the ANI mark circuits into the telephone sets at the time of manufacture, but to make the circuit connections in such a way that the ANI mark circuits remain inactive or disabled until such time that it is desired to install the telephone at a tip party station on a two-party line.

Because of this custom, service calls are frequently needed when a telephone set is later assigned to a new or different subscriber for the purpose of converting the set in some cases to single party or ring party use and in other cases to tip party use. Many times existing telephones already installed are not equipped with ANI mark circuits. If conversion is required for tip party use, a service call is required, and physical access to the telephone is needed in order to make a modification to utilize a circuit arrangement which must be installed in the instrument itself. In addition, house calls will be required to equip subscriber's telephones with the type of ringer isolator that is installed in the telephone itself.

In order to avoid the requirement of obtaining access to the physical telephone instrument, many circuits have been devised to provide the ANI mark equipment in such a way that it need not be physically housed in the instrument itself. One example of such an ANI mark circuit is shown in FIG. 2 of U.S. Pat. No. 4,001,512 issued to D. F. Proctor on Jan. 4, 1977. Another example of this type of circuit is disclosed in U.S. Pat. No. 4,054,942 issued to C. W. Chambers, Jr., on Oct. 18, 1977.

Both of these prior ANI mark circuits may be installed without requiring access to the subscriber's telephone. As a result no changes are required in the telephone itself or in the wiring to the telephone to divert the telephone station to tip party use on a two-party line. The ANI mark circuits described in the above-mentioned patents, however, have serious drawbacks.

In both patents, for example, the circuit designs are such that insertion or line losses are created by electrical components which are connected in the subscriber loop itself in series with one or both of the different ring conductors. In Pat. No. 4,054,942 and in one of the embodiments of Pat. No. 4,001,512 there is the additional problem of electrical noise which is created by grounding one of the two subscriber line conductors (usually the tip conductor) through a resistor, but not the other conductor in the course of establishing the ground mark.

In another type of prior ANI mark circuit, the base-emitter junction of a bipolar transistor is connected across a resistor that is in series with the tip conductor of the tip party's drop, and the collector of the transistor is connected to ground through a resistor (usually 2.6 K ohms). With this circuit design, loop current flow in the tip party's loop circuit turns on the transistor to create a difference in the current flowing in the tip and ring conductors. Resulting current difference is sensed by ANI equipment in the central office. This ANI station identification circuit is referred to as the differential type and cannot be employed with the longitudinal type of identification in which a current path to ground is sensed at the central office to identify the calling party as the tip party.

Examples of prior ringer isolator circuits are described in U.S. Pat. No. 3,916,111 issued to H. W. Ott on Oct. 28, 1975, U.S. Pat. No. 3, 303,289 issued to M. S. Hawley, et al on Feb. 7, 1967 and U.S. Pat. No. 3,230,316 issued to P. M. Hunt on Jan. 18, 1966.

These patented ringer isolator circuits for the most part are normally wired into the telephone set itself and therefore present a problem of obtaining access to the telephone to make the installation as mentioned earlier. All of the prior devices are not suitable for use on a four-party line where each party must be individually identified.

The present invention avoids the foregoing problems and drawbacks as well as offering additional advantages as will become apparent from the following summary and description.

SUMMARY OF THE INVENTION

The present invention provides a novel ANI mark or station identification circuit which may be used individually or combined with a ringer isolator into a common unit for connection to a subscriber's drop without requiring access to or rewiring of the subscriber's telephone. The unit containing the combined, electrically compatible ringer isolator and ANI mark circuits may also optionally include a station protector such as a gas tube arrestor. The present circuit arrangement is capable of being used with central office equipment that utilizes detection methods for sensing the application of the mark signal at the central office to identify the calling party on a four-party line. The ANI mark circuit of this invention operates to apply a ground mark in response to any (each) interruption of loop current after the tip party's telephone is lifted off-hook to enable the central office equipment to sense the presence of a current path to ground and is compatible with central office equipment which utilizes a longitudinal detection method.

In the longitudinal embodiment of the four party ANI mark circuit, the DC responsive ground mark circuit is responsive to the initial loop current flow when one of the four party's telephone is lifted off-hook and enables a ground mark switching circuit to apply a DC responsive tip-to-ground and ring-to-ground. The application of a balanced tip-to-ground mark and ring-to-ground mark through equal resistances is sensed by central office equipment utilizing a known detection method. When a central office utilizes a longitudinal detection method generally $-48$ and a $+48$ volts is sequentially placed on the tip or tip and ring shorted together and the present circuit arrangement senses the loss of loop current and places a DC responsive tip-to-ground mark completing a current path to ground depending upon which polarity of voltage is applied, that is sensed by a central office utilizing a longitudinal detection method. In the preferred embodiment one party's line (4th) will have its mark applied only when −48 volts is applied by the central office. Another party's line (3rd) will have its mark applied only when +48 volts is applied. Yet another party (2nd) will have its mark applied when both −48 volts and +48 volts is applied and the last party (1st) will not have a mark applied with −48 volts or +48 volts supplied by the central office equipment.

The ANI mark circuit of this invention is designed in such a way that practically no insertion or line losses or imbalances are introduced into any party's line.

With the foregoing in mind, a major object of this invention is to provide a novel ANI mark circuit which is not subject to the previously described disadvantages of prior ANI mark circuits and may be utilized with central office equipment utilizing longitudinal detection methods and is equipped to identify the calling party on a four party line.

Another object of this invention is to provide a novel unit which incorporates an ANI mark circuit that is adapted to be utilized on a four-party line and be connected outdoors to a subscriber drop without requiring access to or rewiring of the subscriber's telephone.

A further object of this invention is to provide a novel ANI mark circuit which applies a DC responsive ground mark in response to the interruption of loop current after one party's telephone of a four party line has been lifted off-hook and a DC voltage is applied by the central office and the central office equipment uses longitudinal detection methods.

A station identification circuit arrangement for central office identification of a preselected one of four parties on a four-party line when a call is initiated from the preselected party's telephone, comprises first means for providing a ground mark which is normally disconnected from the line when the preselected party's telephone is on-hook. The ground mark is responsive to the polarity of the DC voltage applied by the central office to sense the presence of the mark. A second means is responsive to a momentary interruption of loop current that occurs after the flow of loop current is established by lifting the preselected party's telephone off-hook and the application of the DC voltage on the line causes the first means to apply the ground mark to at least the tip conductor of the line.

The foregoing and other objects and advantages will appear from the description to follow. In the description reference is made to the accompanying drawing which forms a part hereof, and in which is shown by way of illustration of specific embodiment in which the invention may be practiced. This embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

DESCRIPTION OF THE PREFERRED EMBODIMENT

Figure 1:
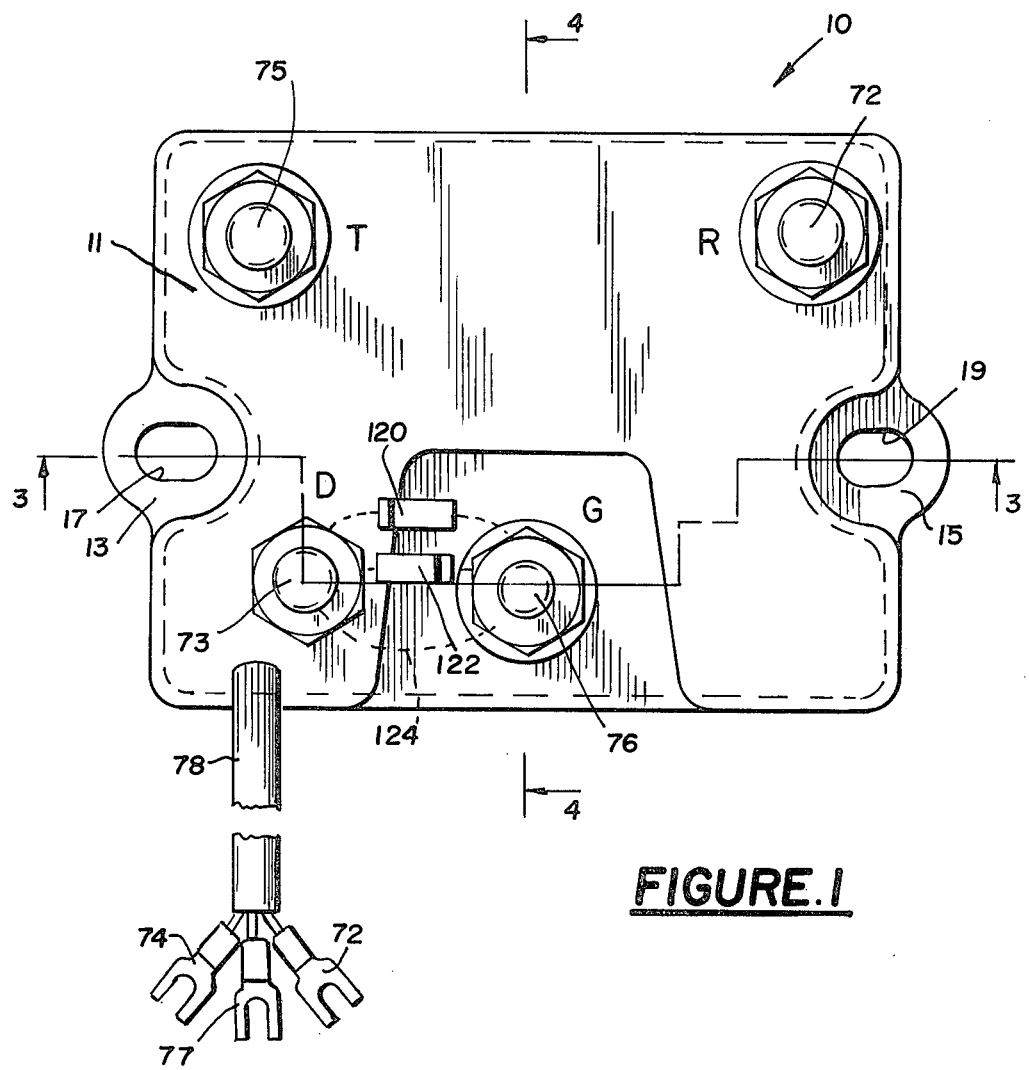
FIG. 1 is a plan view of the housing in which the preferred circuit arrangement may be mounted.
Figure 5:
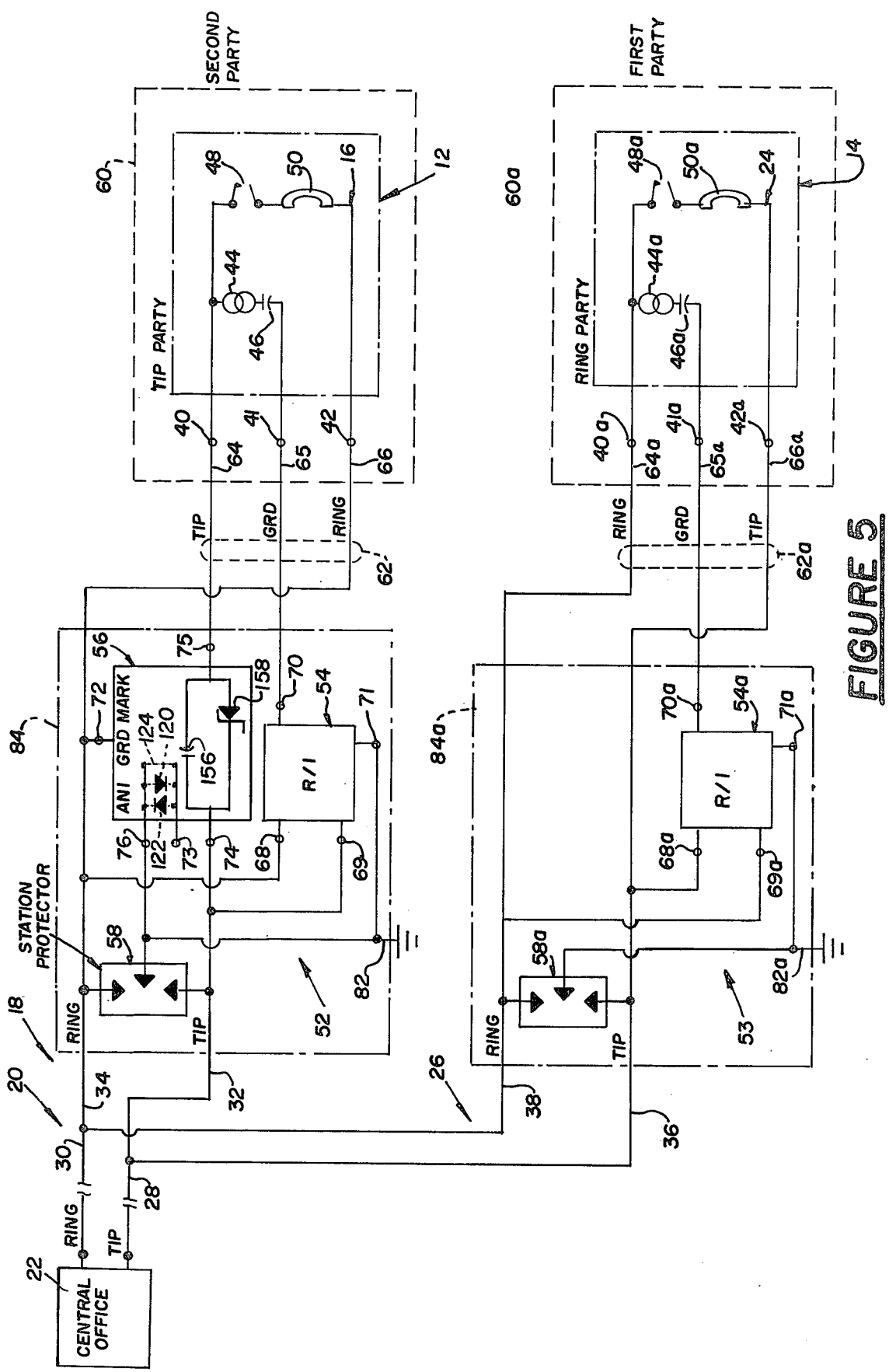
FIG. 5 is a schematic diagram of a four telephone system incorporating the principles of the present invention.

Referring now to the figures, and in particular to FIG. 1, where a four-party subscriber loop circuit 10, incorporating the principles of the present invention, is shown comprising a housing 11, that preferably is fabricated from an insulating material such as hard rubber, phenolic, or the like. A pair of flanges 13 and 15 having apertures 17 and 19, respectively, provided therein at the base of the housing permits the housing to be mounted to a flat surface with the aid of mounting screws, not shown. The upper surface of the insulated housing 11 is provided with electrically conductive terminals which are normally connected to the telephone instrument 12. The instrument typically has three wires eminating therefrom such as the tip conductive wire 64 that is normally connected to terminal 75, wire 65 which is connected to terminal 76 or terminal 70 if a ringer isolator 54 is utilized, and wire 66 which is connected to terminal 72. When a ringer isolator circuit arrangement is utilized terminal 71 of the ringer isolator is normally connected to terminal 76 and wire 77 is connected to earth ground via wire 82. An additional electrically conductive terminal 73 is provided proximate the ground terminal 76. Connected between terminals 73 and 76 is a diode 120 which has its cathode electrode connected to terminal 73 and its anode electrode connected to terminal 76, or a diode 122 which has its anode electrode connected to terminal 73 and its cathode electrode connected to terminal 76, or a conductive wire (short circuit) 124 connected between terminals 73 and 76. The function of the diodes or short circuit will be explained hereinafter when a detailed description of the circuit arrangement is explained. Suffice it to say for the moment, that either diode 120, 122, or short circuit 124 is utilized. These components are in the ground return path of the four-party line and make the ANI mark circuit DC responsive. Extending out of the housing 11 is a cable 78 which includes three wires 74, 77, and 72. Terminal wire 74 may be connected to ringer isolator terminal 69, terminal wire 77 is common with terminal 76 and may be connected to ringer isolator terminal 71, and terminal wire 72 may be connected to ringer isolator terminal 68 as is shown in FIG. 5.

Figure 2:
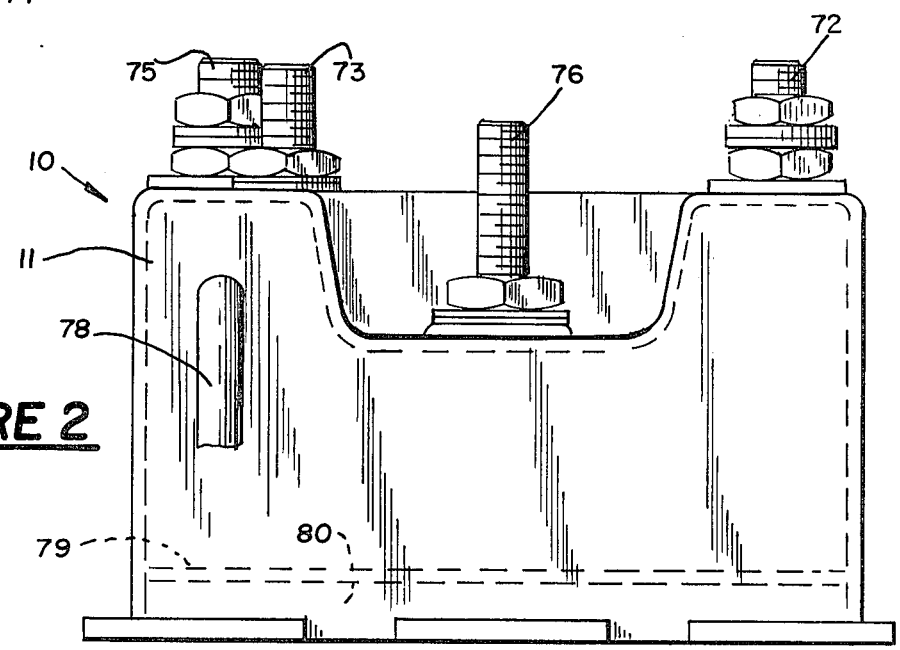
FIG. 2 is a front view in elevation of the housing shown in FIG. 1.
Figure 6:
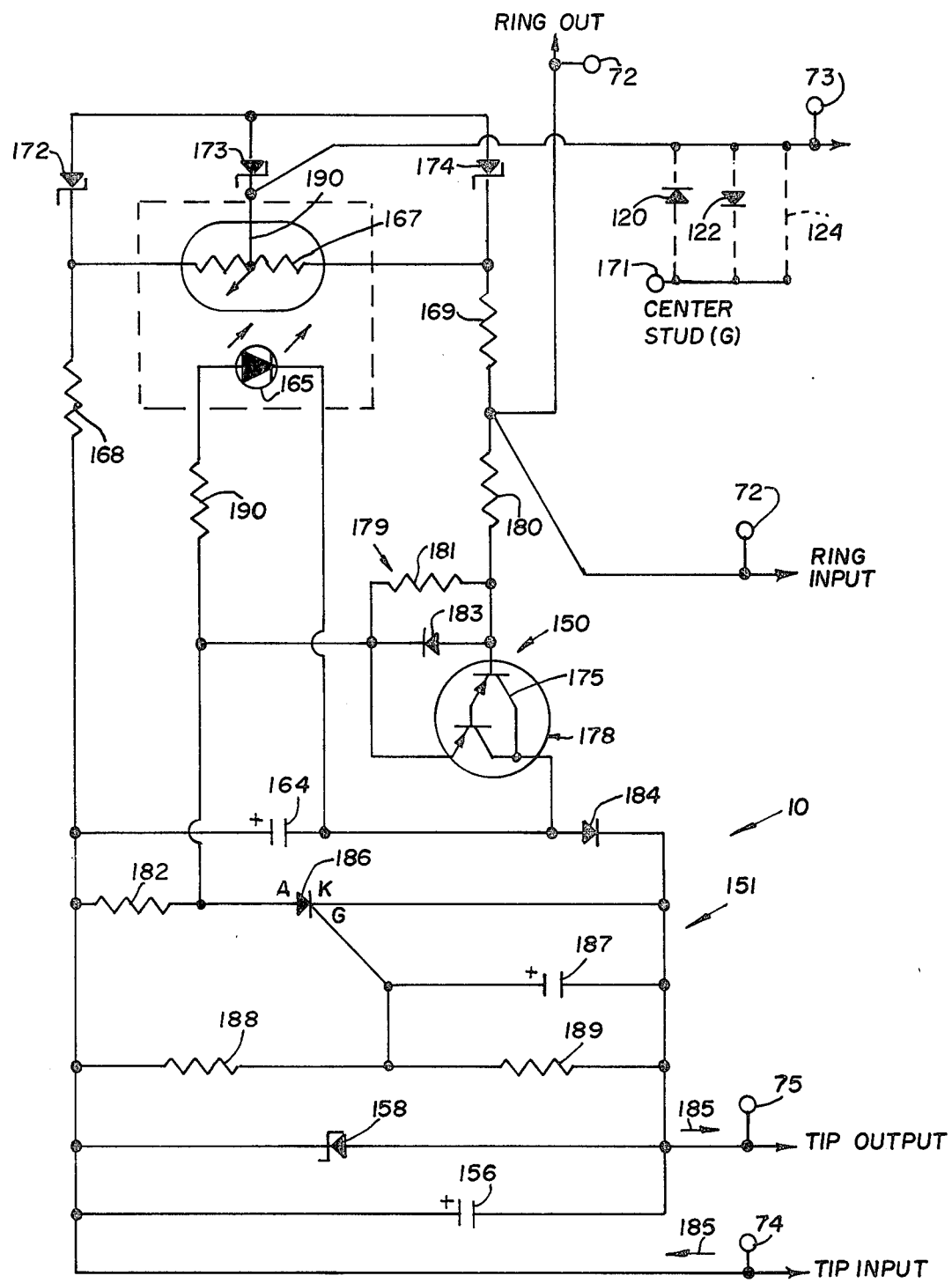
FIG. 6 is a schematic circuit diagram of the station identification circuit arrangement (ANI mark circuit) of the present invention.

FIG. 2 is a front view in elevation of the preferred housing utilized for the four-party ANI mark circuit arrangement and shows in broken lines the position of the printed circuit board 79 which is utilized to mount all the components used in the circuit arrangement shown in FIG. 6. The print circuit board 79 is of a conventional type and may be positioned proximate the bottom or lower edge of the housing 11 and affixed therein by an epoxy adhesive or a cover plate 80 which may be again placed in position and held there by epoxy or a liquid epoxy poured thereon to seal the unit and protect the components on the printed circuit board. Stud terminal 75 extends downwardly from the upper surface of the housing 11 and is affixed to the printed circuit board 79 making electrical contact therewith in a conventional manner.

Figure 3:
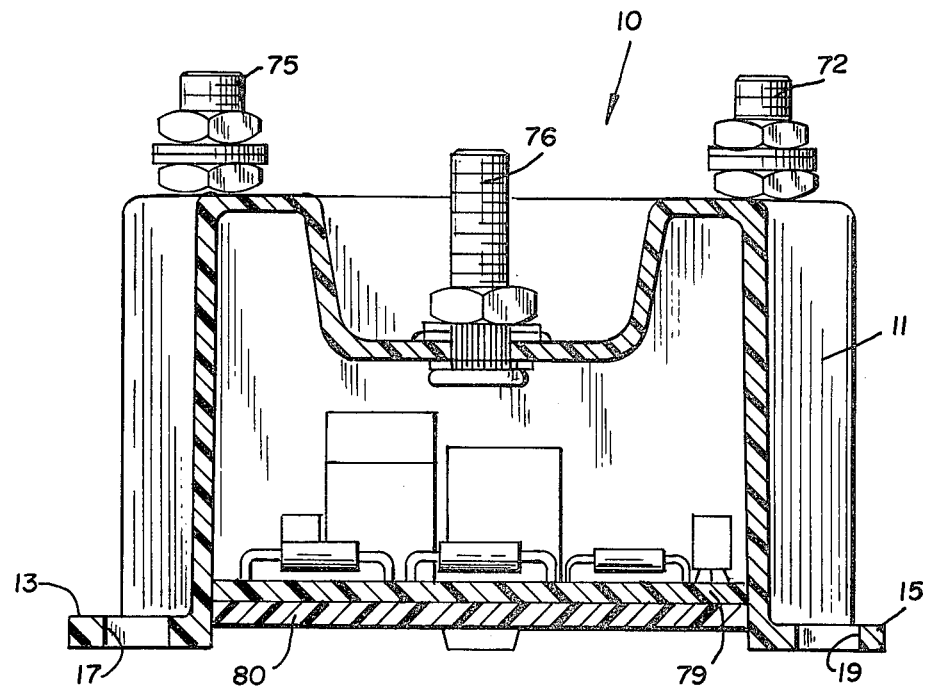
FIG. 3 is a view taken along the line 3—3 of FIG. 1.

FIG. 3 is a cross-sectional view taken along the line 3—3 of FIG. 1 and discloses the electrical components mounted in the printed circuit board 80. The components extend upwardly and are surrounded by the housing 11 thereby protecting them from the outside environment.

Figure 4:
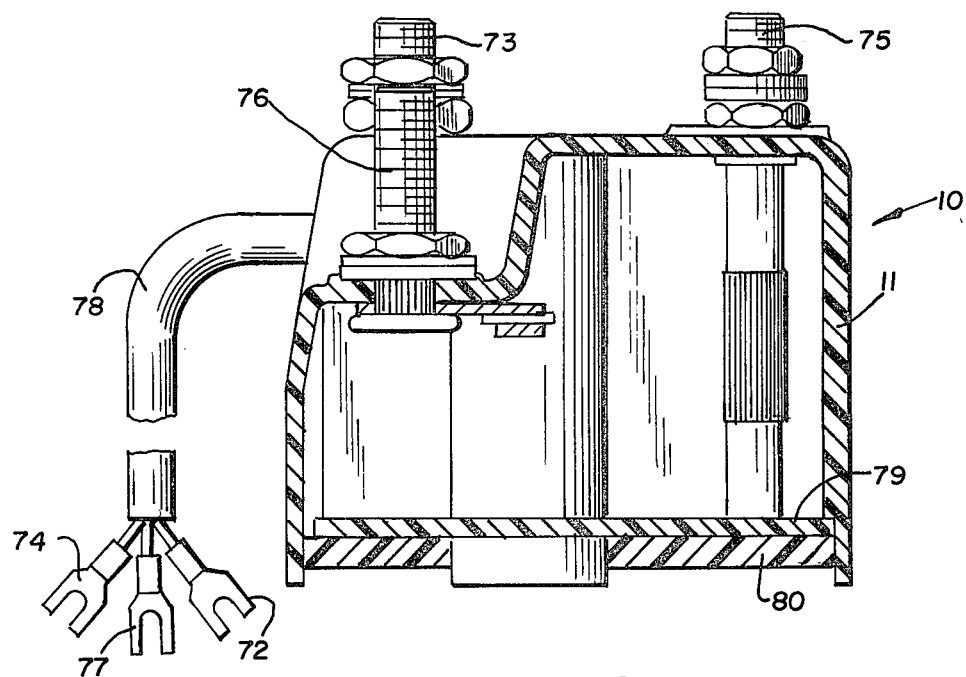
FIG. 4 is a view taken along the line 4—4 of FIG. 1.

FIG. 4 is a cross-sectional view taken along the line 4—4 of FIG. 1 and further indicates the position of the bottom cover plate 80, the printed circuit board 79 and the terminal 75 coming into electrical contact with the printed circuit board.

Referring now to FIG. 5 which discloses a schematic of a two-party subscriber loop that may readily be modified to a four-party subscriber loop, according to the principles of the present invention. The schematic includes a tip party telephone station 12, and the ring party telepone station 14. A second tip and ring party pair may be added to the drop, as will be explained hereinafter.

The telephone set 16 and the tip party station 12 is connected by way of a subscriber's drop 18 (sometimes referred to as a drop wire) and a telephone or transmission line 20 to a central office 22. The telephone set 24 in the ring party station 14 is connected by a separate subscriber's drop 26 and line 20 to the central office 22.

The line 20 is common to telephone stations 12 and 14 and has tip and ring conductors 28 and 30 as shown. Drop 18 and line 20 combine to define a first subscriber's loop or line for the tip party; and drop 26 and line 20 combine to define a second subscriber's loop or line for the ring party.

Two additional drops, not shown, may be added to combine with line 20 thereby defining a third and fourth subscriber's loop or line by having two ring parties and two tip parties. By utilizing a DC responsive mark circuit arrangement the central office is capable of determining which party goes off-hook.

Still referring to FIG. 5, the subscriber drop 18 has tip and ring conductors 32 and 34, respectively, which connect to the tip and ring conductors 28 and 30, respectively, of line 20. Likewise, drop 26 has tip and ring conductors 36 and 38, respectively, which connect to the tip and ring conductors 28 and 30 of line 20.

Telephone set 16 comprises a conventional three wire circuit having three terminals 40, 41, and 42 for making wiring connections to the plant or facility outside of the subscriber's dwelling. As shown, set 16 includes a ringer 44 and a capacitor 46 connected in series between terminals 40 and 41 and also a hook switch 48 and the handset 50 connected in series between terminals 40 and 42.

The ring party's telephone set 25 is the same as the tip party's telephone set 16. Like reference characters have therefore been applied to designate corresponding components of sets 16 and 24 except that the reference numerals for set 24 have been suffixed by the letter "a" to distinguish them from the reference numerals applied to set 16.

The tip and ring party's station units incorporating the principles of the present invention are respectively indicated at 52 and 53 in FIG. 5. The tip party unit 52 is connected to the subscriber's end of drop 18, and the ring party unit 53 is similarly connected to the subscriber's end of drop 26. In the preferred embodiment unit 52 comprises a ringer isolator 54 and an ANI group mark station identification circuit arrangement 56. A station protector 58 may optionally be included in unit 52 as shown. The station protector 58 may be a conventional three electrode gas tube surge arrestor such as the series TII-300 manufactured by the TII Corporation, Lindenhurst, N.Y.

Unit 52 is normally located outside of the tip party's home or building which houses telephone set 16 and which is schematically indicated in dashed lines at 60 in FIG. 5. Terminals 40 through 42 of telephone set 16 are connected by a three conductor station wire 62 to unit 52 in a manner to be described hereinafter.

As shown, the three conductors of the station wire 62 are indicated at 64, 65, and 66 in FIG. 5 and are respectively connected to terminals 40, 41 and 42. In this embodiment, the ringer isolator is provided with four operating terminals 68, 69, 70 and 71, and the ANI mark circuit 56 also has five terminals as indicated at 72, 73, 74, 75, and 76.

As shown, the ring side or ring conductor 34 of drop 18 is connected to one end electrode of the gas tube surge protector 58, to terminals 68 and 72 and through conductor 66 to terminal 42. The tip side or tip conductor 32 of drop 18 is connected to the upper end electrode of protector 58, and to terminals 69 and 74.

In the ANI mark circuit 56 a series current conducting path is established between terminals 74 and 75 through a zener diode 158, as shown, and a capacitor 156 connected in parallel therewith, thus providing an AC and DC path to extend the tip side of the line. Conductor 64 connects terminal 75 to terminal 40 and conductor 65 connects terminal 41 to terminal 70. The center electrode of protector 58 and terminals 71 and 73 are all connected by a common ground wire 82 to earth ground.

With the circuit connections just described for the gas tube protector 58, the gas tube will fire when lightening or other induced surge occurs to cause both the tip and ring sides of drop 18 to become grounded through the gas tube's high conductivity ion path to the tube's center electrode which is connected to earth ground.

In addition to being electrically combined or connected in unit 52 in the manner shown, protector 58, ring isolator 54 and the ANI mark circuit 56 may advantageously be incorporated into a common package or container which is schematically indicated at 84 in FIG. 5.

Alternatively, protector 58 may be located outside of unit 52 and container 84. With such an arrangement unit 52 will consist of ringer isolator 54 and the ANI mark circuit 56 and may be mounted at protector 58. In either case, unit 52, with or without protector 58, makes access to or rewiring of the station telephone 16 unnecessary.

Moreover, the ringer isolator 54 and the ANI mark circuit 56 may be used individually as separate components. As is apparent, access to or rewiring of the subscriber's telephone is also unnecessary when either the ringer isolator 54 or the ANI mark circuit 56 is used individually on a four-party line.

The ring party unit 53 is the same as the tip party unit 52 except that it does not have an ANI ground mark station identification circuit. Additionally, the circuit connections to the telephone set 24 and the ringer isolator in unit 53 differ as will be described in detail later on. To the extent that unit 53 is the same as unit 52, like reference numerals suffixed by the letter "a" have been applied to designate corresponding components of unit 53. In a like manner, an additional ring and tip party may be added to form a four-party line as will be explained hereinafter.

Referring to FIG. 6, the ANI mark circuit 56 (also called the tip party station identification circuit) is shown to mainly comprise a longitudinal mark squelch circuit 150 and a longitudinal ground mark switching circuit 151. Briefly, the squelch circuit 150 is responsive to loop current flow when the tip party's telephone 16 is lifted off-hook to enable the longitudinal control 151 to charge a capacitor 164. When the central office lifts loop current off line 20 (i.e., interrupts loop current) to interrogate the four-party subscriber loop circuit for the presence of a ground mark (i.e., the establishment of a current path to ground), circuit 151 operates to discharge capacitor 164. The current discharged from capacitor 164 operates a device (in this case a light emitting diode 165 which causes a ground mark to be applied to the tip party's drop 18.

The ANI equipment in the central office senses the application of the ground mark (i.e., the ground current path) to identify the calling party as one of the four parties (tip) and to provide the operation for billing the call to the calling party in the event that the dialed call is a toll call.

Since the other ring parties have a diode in their ANI mark circuit, or a short circuit, a ground mark will be applied to the other party's subscriber drop or loop circuit when the ring party comes off-hook to initiate a call with no DC voltage applied from the central office or when a positive or negative voltage is applied from the central office. Thus, when the central office equipment initiates a toll ticketing condition by lifting the loop current off line 20, and applying a DC voltage a ground mark will be sensed by the ANI equipment in the case of only party #2 (having a short circuit) if he is the party making the call and the third or fourth party will also have a ground mark sensed, depending upon the polarity of the voltage. As a result the ANI equipment will identify the party making the call in a known manner as the party calling and will operate to bill the party in the event that the call is a toll call. In this manner the party dialing the toll call will be identified for billing purposes.

Referring now in greater detail to FIG. 6, the ground mark switching circuit 151 is shown to comprise a ground mark resistance network 166 which provides the ground mark (the current path to ground) and which is connected between terminals 72 and 74. Network 166 is therefore connected across the bridges the tip and ring conductors of the tip party's drop 18.

As shown, network 166 comprises a light sensitive resistor 167 and two resistors 168 and 169 of equal fixed resistances. Resistors 167, 168 and 169 are connected in series between terminals 72 and 74, with resistor 167 being connected between resistors 168 and 169 as shown.

Still referring to FIG. 6, resistor 167 is provided with a center tap 170 which is connected through terminal 73 which in turn is connected either via diode 122, 124, or short 124 to ground stud (G) 171 to earth ground. By this arrangement the resistance between center tap 170 and one end of network 166 at terminal 72 is equal to the resistance between tap 190 and the other end of network 166 at terminal 74. The resistance in the network's tip-to-ground resistance path is therefore equal to the resistance in the network's ring-to-ground resistance path. By this balanced ground mark impedance arrangement no imbalance is introduced into the line during the application of the ground mark.

Zener diodes 172, 173 and 174 have their anode electrodes connected together (in common) with their cathode electrodes connected to both ends and the center top 190 of resistor 167. Preferably, the zener diodes are chosen with a 200 volt zener voltage and function to protect resistor 167 from overvoltage transients. When the light emitting diode 165 is in its inert or non-conducting state, it will not emit light. The resistance of resistor 167 is therefore very large and effectively opens the circuit between resistor 168 and ground and between resistor 169 and ground. The tip and ring conductors of the tip party's drop 18 will therefore be electrically disconnected from the earth ground at terminal 171. Under this condition the ground mark will be removed.

When the light emitting diode 165 conducts current it will emit light which impinges upon resistor 167 and reduces the resistance of resistor 167 to a negligible value. This establishes two resistive current conducting paths of equal resistances to ground, one between the tip conductor 32 and ground and the other between ring conductor 34 and ground. Under this condition the ground mark is applied, and may be sensed at the central office in a manner to be described in greater detail later.

As shown in FIG. 6, the squelch circuit 150 comprises a pair of transistors 175 and 176 in a Darlington circuit configuration 178 and a voltage divider network 202 for biasing Darlington 200. Network 179 comprises resistors 180, 181 and 182. Resistors 180-182 are connected in series between terminals 72 and 74 and hence between the ring and tip conductors of the tip party's drop 18.

The junction between resistors 180 and 181 is connected to the base electrode of the Darlington's input transistor 175, and the junction between resistors 181 and 182 is connected to the emitter electrode of the Darlington's output transistor 176 to provide the bias for the Darlington. A diode is connected from the base electrode of transistor 175 to the emitter electrode of transistor 176 to maintain 0.7 volt bias thereacross and protect the Darlington from any reverse overvoltage transients.

The circuit design for voltage divider 179 and the Darlington circuit configuration 178 will not turn on until a negative voltage applied across the tip and ring conductors 32 and 34 is equal to or greater than a preselected threshold such as, for example, about −15 volts. Darlington 178 will therefore be forward biased when the central office grounds tip conductor 32 and places the negative battery potential of −48 volts on ring conductor 42. However, Darlington 178 will not be forward biased and will therefore be turned off when the tip party's telephone 12 is lifted off-hook to reduce the voltage across the tip and ring conductors 32 and 34 to some low value ranging from about −6 volts to −10 volts.

As shown, capacitor 164 and diode 184 are connected in series across terminals 74 and 75. Diode 184 is so poled that its anode electrode is connected to one plate of capacitor 164 and its cathode electrode is connected to terminal 75. The collector of transistors 175 and 176 are connected to the junction between capacitor 164 and diode 184.

From the foregoing circuit description it will be appreciated that the current conducting path of resistor 182 and the collector-emitter electrodes of transistor 176 is connected across capacitor 164. Resistor 182 is relatively small being on the order of about 100 to 150 ohms, so that the Darlington's collector-emitter current flow through resistor 182 will result in only a very small drop across resistor 182. The voltage across the collector emitter of transistor 176 will also be small when Darlington 178 conducts.

When Darlington 178 is forward biased it will therefore establish a relatively low impedance path across capacitor 164 to keep the capacitor discharged. This low impedance current path across capacitor 164 is established through resistor 182 and the collector-emitter electrodes of transistor 176. If capacitor 164 is charged when Darlington 178 is turned on, it will discharge through resistor 182 and the emitter-collector electrode path of transistor 176.

When Darlington 178 is in its non-conducting state, no collector current is conducted with the result that the voltage across the collector-emitter electrodes of transistor 176 will rise to the voltage across the tip and ring conductors 32 and 34. Accordingly, the low impedance path across capacitor 164 will be removed permitting capacitor 164 to be charged when Darlington 178 is switched to its non-conducting state.

As shown, zener diode 158 has its cathode connected to terminal 74 and its anode connected to terminal 75 so that it is reverse biased by normal loop current flow which is counterclockwise as indicated by the arrow 185 in FIG. 6. Zener diode 158 is in parallel with the series combination of capacitor 164 and diode 184. As will become apparent from the following description, diode 158 and capacitor 156 in parallel therewith are the only components serially connected in the tip party's subscriber loop or line which is formed by line 32 and drop 18.

In addition to the components already mentioned, switching circuit 151 includes an SCR (a silicon controlled rectifier) 186, capacitors 187 and resistors 188, 189, and 190.

As shown, resistor 182 and SCR 186 are connected in series between terminals 74 and 75 in parallel with zener diode 158 and in parallel with the series combination of capacitor 164 and diode 184. Resistors 188 and 189 are connected in series between terminals 74 and 75 in parallel with the series combination of resistor 182 and SCR 186 to define a voltage divider for driving the gate electrode of SCR 186.

As shown, the junction between resistors 188 and 189 is connected to the gate electrode of SCR 186. Capacitor 187 is connected between the gate of electrode of SCR 186 and terminal 75 in parallel with resistor 189 and in series with resistor 188. Capacitor 156 is connected across zener diode 158 between terminals 74 and 75 and provides an AC shunt around zener diode 158 for the voice signals.

The current path for feeding current through the light emitting diode 165, which is light coupled to resistor 167, is through terminal 74, resistor 182, resistor 190, the light emitting diode itself 165, diode 184 and terminal 75. Resistors 182 and 190 and diodes 164 and 184 are all connected in series between terminals 74 and 75 as shown.

When the telephone line is in its idle state with telephone 16 on hook, no loop current will flow through the tip party's subscriber drop 18, ring side of the line at 34 will be at the negative central office battery potential of −48 volts, and the tip side of the line at 32 will be at ground potential or zero volts. For this tip to ring voltage condition, current will be conducted through voltage divider 179 from the tip conductor 32 (74) to the ring conductor 34 (72) to forward bias Darlington 178. As a result, Darlington 178 will establish the low impedance current path across capacitor 164. Capacitor 164 will therefore be discharged in the above-mentioned idle state of the line.

In this idle state, no current will be conducted through the light emitting diode 165 because no charge is available on capacitor 164. Additionally, SCR 186 will be turned off because of the lack of gate current, and capacitors 156 and 187 will not be charged because of the absence of current flow through the tip conductor 32.

When the tip party's telephone 16 is lifted off-hook to dial a call, hook switch 48 closes to complete the operating loop circuit. Loop current will therefore flow in line 20 and drop 18 and through the telephone set which presents a relatively low resistance (e.g., 200 ohms). As a result, the voltage on the ring conductor 34 will drop to a relatively small negative value ranging from about −6 volts to −10 volts. Because of this reduction in voltage across the tip and ring conductors 32 and 34, Darlington 178 will turn off or become non-conducting as previously explained to increase the impedance of the low impedance path that was shunted around capacitor 164.

With hook switch 48 closed to establish loop current flow and with Darlington 178 now in its non-conducting state, capacitors 164, 156, and 187 will begin charging. Capacitor 164 will be charged by loop current through diode 184 which at this time is forward biased. Capacitor 187 will be charged by loop current through resistor 188, and capacitor 156 will be charged by loop current flowing in through terminal 74 and out through terminal 75.

The left hand plates of capacitors 164 and 156 will therefore become positive while right hand plates of capacitors 164 and 156 become negative. The voltage across capacitors 164 and 156 will therefore back bias zener diode 158 as the capacitors charge. The zener potential of zener diode 158 is selected at some relatively low value such as approximately 5 volts Capacitors 164 and 156 charge relatively quickly because of the lack of resistances present in the charging paths in switching circuit 151. The time constant for capacitor 187, however, will be much slower because resistor 188 is relatively large.

Because of the relatively short time constant for capacitors 164 and 156 the voltage across the capacitors will rapidly build up to the zener potential of zener diode 158. When this happens, diode 158 breaks down to limit the voltages across capacitors 164 and 156. Thereafter, the voltage on capacitor 187 builds up sufficiently to reach the firing potential (about 0.8 volts) for SCR 186. SCR 186 will therefore fire to conduct loop current through resistor 182.

Because of the very small resistance of resistor 182 virtually all of the loop current will be conducted through resistor 182 and SCR 186 when SCR 186 turns on. As a result the voltage drop across terminals 74 and 75 will be reduced to a very low value that is insufficient to cause diode 184 to conduct. Diode 184 therefore stops conducting to open the charging circuit for capacitor 164. In addition the very low voltage drop which is created across the circuit by conduction of SCR 186 is small enough to keep the current flow from capacitor 164 through diode 165 to a low value that is below the current threshold needed to illuminate diode 165. As long as SCR 186 remains in conduction, therefore, it will prevent capacitor 164 from discharging sufficient current to illuminate the light emitting diode 165. Diode 184 is poled to prevent capacitor 164 from discharging through SCR 186 when SCR 186 is turned on. Up to this time, therefore, diode 165 will not emit light so that resistor 167 will be at its high open-circuit value to prevent the ground mark from being applied.

From the description thus far it will be appreciated that very shortly after lifting the tip party's telephone 16 off-hook, a charge will be stored on capacitor 164 and will be held there by the conduction of SCR 186. It will be noted that the circuit design is such that the only current available for illuminating diode 165 is from the charge stored on capacitor 164. Until capacitor 164 discharges through resistors 182 and 190, therefore, light emitting diode 165 will be off and the ground mark will be removed.

Capacitor 164 will be charged to the maximum value set by the zener potential of diode 158 before the central office equipment interrupts loop current to initiate a toll ticketing condition.

In a typical crossbar central office switching system, the following sequence usually takes place to establish a toll ticketing condition after either one of the parties comes off-hook and before dial tone is supplied to the off-hook party. First, the central office equipment will momentarily interrupt the loop current shortly after the party's telephone is lifted off-hook; shortly after, and while the loop current is still interrupted, the tip and ring conductors of line 20 are momentarily shorted together, a battery potential of −48 volts or +48 volts is applied by the central office to the interconnected tip and ring conductors. Some central offices will allow the ring conductor of line 24 to float and will apply the positive and negative battery potentials to the tip conductor instead of shorting the tip and ring conductors of line 20 together and applying the negative battery potential to both conductors. The ANI mark circuit 56 works for both types of offices.

The time constants in the ANI mark circuit are such that capacitor 164 will be charged to the maximum permitted value and SCR 178 will be turned on in the time interval between the moment the calling party's telephone is lifted off-hook to cause loop current to flow and the moment the central office lifts the loop current off line 20 to initiate the sequence described above.

As soon as the central office interrupts the loop current in this sequence, capacitor 187 will begin to rapidly discharge through the gate electrode of SCR 186, and when capacitor 187 completes discharging, SCR will return to its non-conducting state to allow capacitor 164 to discharge current through the light emitting diode 165. This current discharge path for the charge stored on capacitor 164 may be traced from the left hand plate of capacitor 164 which is charged at positive potential, through resistor 182 and resistor 190 and through diode 165 to the capacitor's right hand plate which is negative.

Almost as soon as loop current is interrupted by the central office, diode 165 will emit light to reduce the resistance of resistor 167 to its current-conducting value for applying the ground mark as previously described. The capacitor discharge time constants are such that SCR 186 will turn off and capacitor 164 will begin to discharge before the central office shorts the tip and ring conductors together and applies the negative or positive battery potential to the shorted conductors.

Assuming that the ground mark has been applied, the central office will therefore sense the resulting current path to ground when it shorts the tip and ring conductors of line 20 together and applies the negative or positive battery potential to the line. Upon reducing resistor 167 to its current conducting value, it is apparent that a mark is established between the tip conductor 32 and ground and also between the ring conductor 34 and ground and depends upon the polarity of the applied DC voltage as explained earlier.

After shorting the tip and ring conductors of line 20 together and applying the negative and positive battery potential to sense whether or not a ground mark has been applied, the central office crossbar system restores loop current to the calling party's subscriber loop and supplies the dialing tone to the calling party to permit the calling party to commence dialing. If the central office sensed a ground mark during the toll ticketing condition, it identifies which one of the four parties is the calling party. If the central office fails to sense a ground mark, it identifies the calling party as the first party. After the dial pulsing is completed, the central office transmits the identity of the calling party to the CAMA (Centralized Automatic Message Accounting) equipment to provide for the billing of the toll call, if one was made, to the identified party.

The discharge time constant for capacitor 164 is made relatively long by virtue of the relatively large resistance in the capacitor's discharge circuit. Preferably, the discharge time constant is made greater than 300 Msec to be sure that the ground mark is applied long enough to be sensed by the central office.

When loop current is restored to the calling party's loop circuit after its momentary removal to enable the central office equipment to check for the presence or absence of a ground mark, Darlington 178 will remain in its non-conducting state and SCR 186 will turn on again to prevent capacitor 164 from continuing to discharge. Circuit 56 will remain in this state throughout the remainder of the call unless there is a battery reversal at the time the calling and called parties are connected to discharge capacitor 164 again. In any case, any remaining charge will be held on capacitor 164 until the party hangs up because SCR 186 will be in its conductive state for this time.

As soon as the tip party returns telephone 16 to its on-hook state, Darlington 178 will again be forward biased to re-establish the low impedance current path for rapidly discharging capacitor 164. In this way the ground mark will quickly be squelched and will not appear on the line after the tip party hangs up to give rise to a possible false billing situation where the ring party comes off-hook shortly after the tip party hangs up and makes a toll call.

When the subscriber loop circuit is opened by dialing, loop current will be interrupted, and the voltage on ring conductor 34 will increase negatively to about −48 volts. Because of the charge stored on capacitor 187, gate current will continue to be conducted to SCR 186 to keep SCR 186 turned on during the intervals of the open loop dialing pulses. This prevents current from being discharged by capacitor 164 through diode 165. In this way the mark will not be applied during the transmittal of the open loop dialing pulses to advantageously avoid the dialing pulse distortion that would otherwise occur if the ground mark were left on during dialing.

With circuit 56 it will be appreciated that in order to apply the ground mark capacitor 164 must first be charged and SCR 186, after being turned on, must then be turned off in response to the interruption of loop current.

From the foregoing description of circuit 56 it will be appreciated that the only component in the tip party's loop circuit is diode 158, and this component is shunted by capacitor 156 which is of relatively large size. As a result, practically no insertion or line loss is introduced into the tip party's subscriber line or loop. Additionally virtually no imbalance is introduced into the tip party's line both when the ground mark is removed and applied. Furthermore, circuit 56 may be used with bridged or grounded ringing systems, can serve all of the telephones at the subscribers location, provides an electrically-timed switch to remove the mark upon the resumption of loop current and employs light coupled solid state circuitry (diode 165 and resistor 167) which affords excellent isolation between the tip conductor and ground and between the ring conductor and ground and may be used on four-party lines.

It will be appreciated that if the ring party's telephone 24 is lifted off-hook to dial a call, rather than the tip party's telephone, loop current will flow in the ring party's drop 26 by virtue of closing the hook switch 48*a*. Because of the resulting decrease in voltage across the tip and ring conductors of line 20, Darlington 178 will turn off to open the low impedance short current path around capacitor 164. Capacitor 164, however, will not charge because no loop current is flowing in the tip party's drop 18. No loop current flows in the tip party's drop 18 because hook switch 48 is open. Since no charge is accumulated in capacitor 164, there is no current available for illuminating the light emitting diode 165 when the central office interrupts the loop current to initiate the sequence for sensing the presence or absence of a ground mark.

As a result the ground mark will not be applied by circuit 56 so that when the central office interrupts the loop current, it will not sense a ground mark or, more particularly, a current path to ground. But if a short circuit 124 is used between terminals 73 and 171 a ground mark will be sensed. As a result the calling party will be identified by the central office as the 2nd party for billing the toll call if one is made. The use of diodes 120 and 122 between terminals 73 and 171 will cause a ground mark to be sensed as the proper polarity of DC voltage is applied from the central office.

Hereinbefore has been disclosed a circuit arrangement that may be used on a four-party line. It will be understood that various changes in the details, materials, arrangement of parts, and operating conditions which have been herein described and illustrated in order to explain the nature of the invention may be made by those skilled in the art within the principles and scope of the instant invention.

Having thus set forth the nature of the invention, what is claimed is:

1. A station identification circuit arrangement for central office identification of a preselected one of four parties on a four-party line having tip and ring conductors when a call is initiated from the preselected party's telephone, comprising:
   (a) first means for providing a ground mark to at least said tip conductor, said ground mark being normally disconnected from said conductor when said preselected party's telephone is on-hook, said ground mark being connected in response to a DC voltage applied by said central office to sense the presence of said mark, said first means including a light dependent resistor connected between at least said tip conductor and a reference ground and a cooperating light emitting means; and
   (b) second means, responsive to a momentary interruption of loop current that occurs after the flow of loop current is established by lifting the preselected party's telephone off-hook and the application of said DC voltage on said line, for causing said first means to apply said ground mark to at least the tip conductor of said line by activating said light emitting means.

2. The station identification circuit arrangement according to claim 1 wherein said second means includes a circuit arrangement for preventing said first means from applying said ground mark to said tip conductor during the occurrence of open loop dialing pulses that are transmitted from said selected party's telephone.

3. A station identification circuit arrangement according to claim 1 wherein said ground mark includes semiconductor means connected in the ground path of said mark, said semiconductor means providing a low impedance path in only one direction.

4. A station identification circuit arrangement for applying a ground mark responsive to the DC voltage applied by a central office to sense the presence of said mark to enable said central office to identify a preselected one of four parties on a four-party line in a telephone system when a call is initiated from the preselected party's telephone, comprising:
   (a) a capacitor;
   (b) means for charging said capacitor with loop current flowing in the preselected party's subscriber drop when the flow of loop current is initiated by lifting the preselected party's telephone off-hook to provide a charge on said capacitor before a first momentary interruption of loop current;
   (c) current conducting means, said current conducting means including light emitting means for emitting light when current flows therethrough;
   (d) means for discharging current from said capacitor through said current conducting means when said interruption occurs after the preselected party's telephone is lifted off-hook to initiate a call; and
   (e) means responsive to said current conducting means for applying said ground mark to at least the tip conductor of the line connecting said selected party's telephone to said central office whenever said capacitor discharges current through said current conducting means, said means for applying said ground mark including light sensitive resistor means optically coupled to said light emitting means, said light sensitive resistor means having a relatively low resistance to current flow when light impinges thereon and a relatively high resistance to current flow in the absence of said light, said light sensitive resistor means being serially connected with a second current conducting means between a terminal adapted to be connected to earth ground and at least said tip conductor for applying said ground mark when it assumes its relatively low resistance to current flow and for removing said ground mark when it assumes relatively high resistance to current flow.

5. The station identification circuit arrangement according to claim 4 wherein said light emitting means is a light emitting diode.

6. The station identification circuit arrangement according to claim 4 wherein said light sensitive resistor means is connected through equal resistances to the tip and ring conductors of said preselected party's subscribers drop to form a resistance network in which said resistances and said resistor means are all connected in series across the tip and ring conductors of said preselected party's subscriber drop, and wherein said terminal adapted to be connected to earth ground is coupled via a second current conducting means to a center tap on said resistor means such that the tip and ring conductors of said preselected party's subscriber drop are connected through equal resistances to said terminal.

7. The station identification circuit arrangement according to claim 4 or 6 wherein said second current conducting means is a short circuit.

8. The station identification circuit arrangement according to claim 4 or 6 wherein said second current conducting means is a diode.

9. The station identification circuit arrangement according to claim 4 wherein said means for charging said capacitor comprises circuit means that normally applies a relatively low impedance path across said capacitor to discharge and prevent charging of said capacitor when said selected party's telephone is on-hook to prevent the flow of loop current in the pre-selected party's subscriber drop, said circuit means being responsive to the flow of loop current that is initiated by lifting said selected party's telephone off-hook to change said relatively low impedance current path to a relatively high impedance current path thereby allowing said capacitor to be charged by said loop current.

10. The station identification circuit arrangement according to claim 9 comprising a zener diode connected in series with the tip conductors of said pre-selected party's subscriber drop, a capacitor being connected in parallel therewith, and said zener diode being back biased by the charge stored on said capacitor to limit the voltage built across said capacitor to the zener potential of said zener diode.

11. The station identification circuit arrangement according to claim 10 wherein said zener diode is the only DC current carrying component of the station identification circuit arrangement that is connected in series with one of the tip or ring conductors of said pre-selected party's subscriber drop, and wherein said capacitor is connected across said zener diode to provide an AC path for bypassing voice signals around said zener diode.

12. The station identification circuit arrangement according to claim 9 wherein said circuit means is connected across the tip and ring conductors of said preselected party's subscriber drop.

13. The station identification circuit arrangement according to claim 12 wherein said circuit means comprises a plurality of transistors connected in a Darlington configuration, a biasing circuit connected to said Darlington configuration for forward biasing said transistors only when the central office battery voltage across the tip and ring conductors of said pre-selected party's subscriber drop is above a pre-selected threshold that is greater than the DC voltage that appears across the tip and ring conductors of said pre-selected party's subscriber drop when loop current is flowing in the pre-selected party's subscriber drop, and means connecting the emitter and collector electrodes of one of said transistors across said capacitor such that when said transistors are forward biased, said short circuit across said capacitor is established.

14. The station identification circuit arrangement according to claim 4 wherein said discharging means includes means for preventing said capacitor from discharging until the loop current is interrupted by said central office to initiate an operation for sensing the presence of the ground mark if it is applied.

15. The station identification circuit arrangement according to claim 14 wherein said means for preventing said capacitor from discharging includes a current conducting device, and means cooperating with said current conducting device to prevent said capacitor from discharging current during the break portions of dialing pulses transmitted from said pre-selected party's telephone.

* * * * *